(12) United States Patent
Rogg (10) Patent No.: US 6,921,984 B2
(45) Date of Patent: Jul. 26, 2005

(54) DRIVE SYSTEM FOR AN INDUSTRIAL TRUCK AND A METHOD FOR THE OPERATION OF THE DRIVE SYSTEM

(75) Inventor: Andreas Rogg, Flintenbreite (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 0 days.

(21) Appl. No.: 10/931,442

(22) Filed: Sep. 1, 2004

(65) Prior Publication Data

US 2005/0046192 A1 Mar. 3, 2005

(30) Foreign Application Priority Data

Sep. 3, 2003 (DE) .......................................... 103 40 472

(51) Int. Cl.[7] .............................................. B60L 11/02
(52) U.S. Cl. ............................. 290/10; 290/31; 290/22; 290/28; 290/40 C; 290/40 B; 290/9; 290/18; 180/65.2; 180/65.4; 180/282
(58) Field of Search .............................. 290/10, 31, 22, 290/28, 40 C, 40 B, 9, 18, 13; 180/65.2, 65.4, 282

(56) References Cited

U.S. PATENT DOCUMENTS

| | | | | |
|---|---|---|---|---|
| 5,495,127 | A | * 2/1996 | Aota | 290/31 |
| 6,124,645 | A | * 9/2000 | Jones et al. | 290/9 |
| 6,791,204 | B2 | * 9/2004 | Sarlioglu | 290/52 |
| 6,812,586 | B2 | * 11/2004 | Wacknov | 290/52 |
| 6,823,954 | B2 | * 11/2004 | Shimabukuro | 180/65.2 |
| 6,825,575 | B1 | * 11/2004 | Edelson | 290/40 |
| 6,838,778 | B1 | * 1/2005 | Kandil | 290/31 |

FOREIGN PATENT DOCUMENTS

| | | |
|---|---|---|
| DE | 196 23 738 | 12/1997 |
| DE | 100 04 812 | 8/2000 |
| DE | 199 55 313 | 5/2001 |
| DE | 199 58 403 | 6/2001 |
| DE | 101 41 923 | 3/2002 |
| DE | 101 52 472 | 5/2003 |

* cited by examiner

Primary Examiner—Nicholas Ponomarenko
Assistant Examiner—Iraj A. Mohandesi
(74) Attorney, Agent, or Firm—Vidas, Arrett & Steinkraus, P.A.

(57) ABSTRACT

A drive system for an industrial truck, comprising an internal combustion engine, a three-shaft epicyclic gearing adapted to be connected to the shaft of the internal combustion engine, a first electric motor which is mechanically coupled to the second shaft of the epicyclic gearing and is connected to an onboard network of the industrial truck, a change-speed gearing coupled to the third shaft of the epicyclic gearing, a summing gearbox coupled to the change-speed gearing the other input shaft of which is connected to a second electric motor which is electrically connected to the onboard network and the output shaft of which is coupled to at least one driven wheel of the industrial truck, a clutch (A) between the first and second shafts of the epicyclic gearing, at least one consumption unit for an additional function of the industrial truck that is coupled to one of the shafts of the epicyclic gearing, a sensor device which measures the speeds of the internal combustion engine, the first and second electric motors, and the driving wheel and generates respective signals, and a control and regulation device which controls or regulates the speeds of the electric motors and internal combustion engine, and controls the motor or generator operation of the electric motors and the actuation of the clutch (A) and change-speed gearing in response to set-point signals from the set-point transmitters actuated by the operator of the industrial truck and on the basis of the output signals of the sensor device.

16 Claims, 6 Drawing Sheets

Operation range B1

FIG.10

Operation range B2

FIG.11

Operation range B3

FIG.12

Operation range B4

FIG.13

DRIVE SYSTEM FOR AN INDUSTRIAL TRUCK AND A METHOD FOR THE OPERATION OF THE DRIVE SYSTEM

CROSS-REFERENCE TO RELATED APPLICATIONS

Not applicable.

STATEMENT REGARDING FEDERALLY SPONSORED RESEARCH

Not applicable.

BACKGROUND OF THE INVENTION

A number of different properties is required of a drive system for industrial trucks, specifically high ride comfort, high travel performances, and low energy consumption. It is further important for the industrial truck to exhibit high handling efficiencies and high accelerations, also in the case of a change in the direction of travel. It is further desirable for the drive to be controllable well during the transport of fragile goods. In cases where an industrial truck is operated in halls or containers the requirement is that no noxious substances be emitted.

The invention relies on a drive system which uses an internal combustion engine. The property typical of an internal combustion engine is that it has an range for power output that is limited by a minimum and a maximum speed, the internal combustion engine naturally being operated exclusively in one sense of rotation. The specific energy consumption of the internal combustion engine can be represented in the form of a family of characteristics in dependence on the speed and the torque produced. Commonly, one or more characteristic curves are established in the family of characteristics that constitute a compromise between a low-consumption operation and an acceleration reserve. Each value of the power input has associated therewith a speed of the driving machine. To achieve high travel performances at a high ride comfort and low consumption of energy, gearing systems are required which have a wide range of adjustable transmission ratios which is infinitely variable, if possible, in order to operate the internal combustion engine largely independently of the travel speed at the speed associated with the power input according to the characteristic curve.

Additional units are connected to the drive system, e.g. hydraulic pumps. Because of their construction type, they act adversely on the speed of the internal combustion engine because they apply their load abruptly, and can cause the engine to be stalled. Therefore, such additional units necessitate dynamic drive systems which can be adjusted to variations of the load at low time constants.

DE 199 55 313 has made known a drive system for industrial trucks which has an internal combustion engine, an electric motor fed from a battery, a gear assembly, and a change-speed gearing for the reversal of the sense of rotation in conjunction with the output shaft. The gear assembly has its input shafts coupled to the internal combustion engine and the electric motor. The output shaft is coupled to the output shaft of the drive system.

DE 199 55 311 A1 has made known a drive system for industrial trucks in which the shaft of an internal combustion engine is coupled to an infinitely variable shift mechanism. A gear assembly has its input shaft coupled to the shaft of the internal combustion engine and has a second input shaft coupled to the output shaft of the variable shift mechanism. An electric motor the shaft of which is coupled to a third input shaft of the gear assembly is controlled from a battery via a power electronic system. A change-speed gearing is arranged between the output shaft of the gear assembly and the driving wheels of the industrial truck. The speeds of the internal combustion engine, electric motor, and output shaft of the change-speed gearing and possibly the charging condition of the battery are measured by a sensor system. In response to set-point signals from the set-point transmitters actuated by an operator of the industrial truck and on the basis of the signals outputted by the sensor system, a regulation device regulates the speed of the electric motor and combustion engine and/or the transmission ratio of the shift mechanism and, if necessary, a rotary brake, and shifts the shift mechanism. In the drive system mentioned last, a reduction occurs to the maximum power to be transmitted by the shift mechanism. This allows to use shift mechanisms the operating efficiency of which otherwise would not be sufficient. The transmission ratio between the internal combustion engine and the output shaft of the drive system can be made zero. This allows to keep the truck at rest with the internal combustion engine running with no need to break the flow of power via a clutch. In addition, it allows to obtain a spread of any magnitude for the transmission ratio.

The invention is based on a branching of power which is performed in the known drive systems, and intends to achieve the object of further improving the travel performances at a high ride comfort and obtaining good regulability infinitely within a large range of adjustable gear ratios. In addition, the object is to achieve a rapid correction in case of an abrupt application of load by additional units and to make possible a zero-emission mode at least for a short period.

BRIEF SUMMARY OF THE INVENTION

In the drive system of claim 1, a three-shaft epicyclic gearing, e.g. a planetary gearing, is connected to the shaft of the internal combustion engine. A first electric motor is coupled to the second shaft of the epicyclic gearing and is connected to an onboard network of the industrial truck. The third shaft of the epicyclic gearing has coupled thereto a change-speed gearing to which, in turn, a summing gearbox is coupled the other input shaft of which is connected to a second electric motor which also is electrically connected to the onboard network. The output shaft of the summing gearbox is coupled to at least one driven wheel of the industrial truck. Further, according to the invention, a clutch is provided between the first and second shafts of the epicyclic gearing. A consumption unit for an additional function of the industrial truck is coupled to one of the shafts of the epicyclic gearing. A sensor assembly which measures the speeds of the internal combustion engine, the first and second electric motors, and the driving wheel and generates respective signals makes it possible for a regulation device to regulate the speeds of the electric motors and internal combustion engine and to control the motor or generator operation of the electric motors and the actuation of the clutch in response to set-point signals from the set-point transmitters actuated by the operator of the industrial truck and on the basis of the output signals of the sensor device.

The inventive solution according to claim 2 relies on the same arrangement of a drive system, but provides for a clutch between the first and third shafts of the epicyclic gearing where the second clutch can be employed in addition to the first clutch or also alone. Therefore, in the case of a solution according to claim 1, the branching of power which otherwise is possible via a mechanical branch and an electric branch can be switched to only one branch, namely the electric branch if operation is very slow, which also makes possible a smooth reversing motion, or solely the mechanical branch if the speed is very high.

The inventive drive system as is set forth in claims 1 and 2 can also be interchanged in a way that the drivable wheel and the internal combustion engine are interchanged with regard to their positions to the gearing assembly.

The particular advantage of the inventive drive system is that the change-speed gearing is composed of two parallel branches in which a clutch is arranged each and wherein one branch has a turn-around gearing.

BRIEF DESCRIPTION OF THE SEVERAL VIEWS OF THE DRAWINGS

The invention will be described in more detail below with reference to the embodiments shown in the drawings.

DETAILED DESCRIPTION OF THE INVENTION

Figure 2:
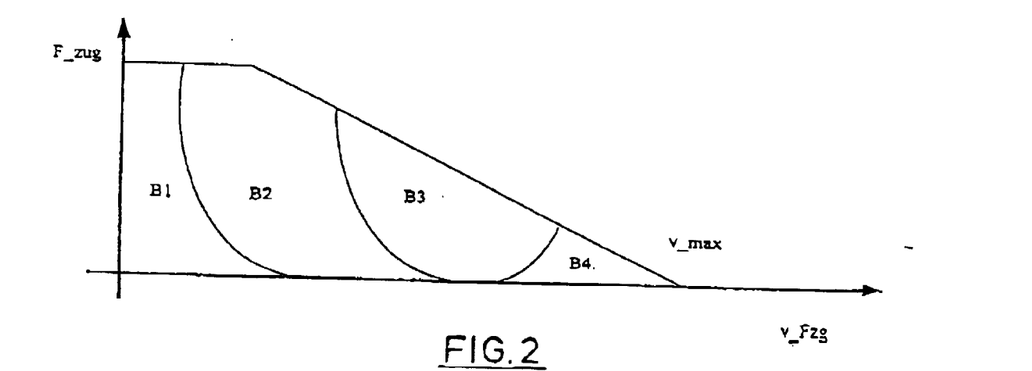
FIG. 2 shows a graph of the dependence of the operation range boundaries on variables of the drive system of FIG. 1.

While this invention may be embodied in many different forms, there are described in detail herein a specific preferred embodiment of the invention. This description is an exemplification of the principles of the invention and is not intended to limit the invention to the particular embodiment illustrated The operating ranges of an industrial truck, inter alia, are dependent on the speed, but FIG. 2 shows that the operation range boundaries can also be dependent on other variables, e.g. the desired propulsive power F_prop. A table is shown below in which the travel speed of an industrial truck is broken up into several operation ranges.

| Travel speed | Direction of travel | Operation range | Power flow | Clutches (for config. type according to FIG. 1) | | | |
|---|---|---|---|---|---|---|---|
| | | | | A | B | V | R |
| Very fast | Backward | B4 (R) | Purely mechanical | ● | | | ● |
| Fast | Backward | B3 (R) | Branched in power | | | | ● |
| Slow | Backward | B2 (R) | Branched in power | | | | ● |
| Very slow | Backward or forward | B1 | Purely electric | ● | | | |
| Slow | Forward | B2 (V) | Branched in power | | | ● | |
| Fast | Forward | B3 (V) | Branched in power | | | ● | |
| Very fast | Forward | B4 (V) | Purely mechanical | ● | | ● | |
| ZEV | | B5 | Purely electrical | | | | |
| Parking | | B6 | — | | | ● | ● |
| Start drive machine | | B7 | — | | ● | ● | ● |

Figure 1:
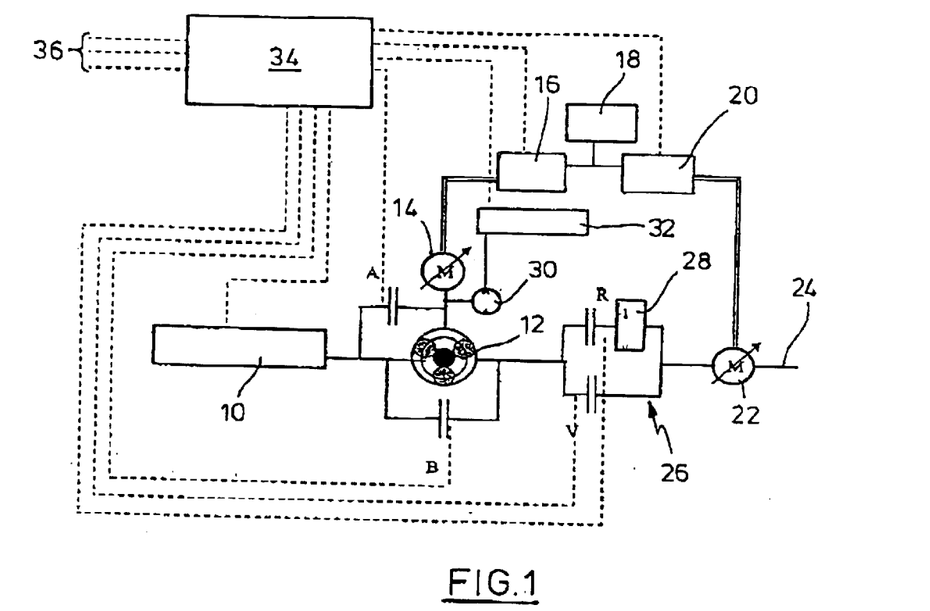
FIG. 1 schematically shows the fundamental structure of a drive system according to the invention.

In FIG. 1, an internal combustion engine 10 is connected to a shaft of an epicyclic gearing 12. A second shaft of the epicyclic gearing 12 is coupled to an electric motor 14. The motor is electrically connected, via an inverter stage 16, to an onboard network which is in communication with a battery 18. The onboard network, via an inverter stage 20, has connected thereto a second electric motor 22 the output shaft 24 of which drives at least one wheel of an industrial truck which is not shown. The electric motor 14 is configured as a hollow-shaft motor and, therefore, functions as a summing gearbox. A third shaft of the epicyclic gearing 12 is coupled to a change-speed gearing 26 the output shaft of which is coupled to the shaft of the hollow-shaft motor 22. The change-speed gearing 26 is broken up into two parallel branches with a clutch R and V arranged in either branch. Moreover, a turn-around gearing 28 is disposed in the upper branch. The second shaft of the epicyclic gearing 12 has coupled thereto a hydraulic pump 30 which provides for individual functions of the industrial truck which is not shown via a valve block 32.

A clutch A is arranged between the first and second shafts of the epicyclic gearing 12. A second clutch B is arranged between the first and third shafts of the epicyclic gearing 12. A superior-rank regulation and control device 34 regulates or controls the internal combustion engine 10, the electric motors 14, 22, the clutches A, B, R, and V, the inverter stages 16, 20, and the valve block 12. This is outlined by phantom efficiency curves. The phantom curves 36 indicate the interface with the set-point transmitters which are actuated by the operator of the industrial truck. A sensor assembly, which is not shown, detects the state of the individual components of FIG. 1 and transmits appropriate signals to the control and regulation device 34 to cause it to regulate and activate the components depicted via the interface 36 in an appropriate manner in response to those signals and the set-point signals. Reference thereto will be made later below.

Finally, it should be mentioned that a standard electric motor having a summing gearbox can be used in lieu of the hollow-shaft motor 22. In this case, the output shaft of the change-speed gearing 26 is connected to one input and the shaft of the electric motor 22 is connected to the other input of the summing gearbox whereas the output shaft of the summing gearbox constitutes the output shaft of the drive system.

The individual operation stages will be described in more detail below with reference to the individual illustrations. It does not matter here whether a forward or backward travel was imposed before.

Figure 3:
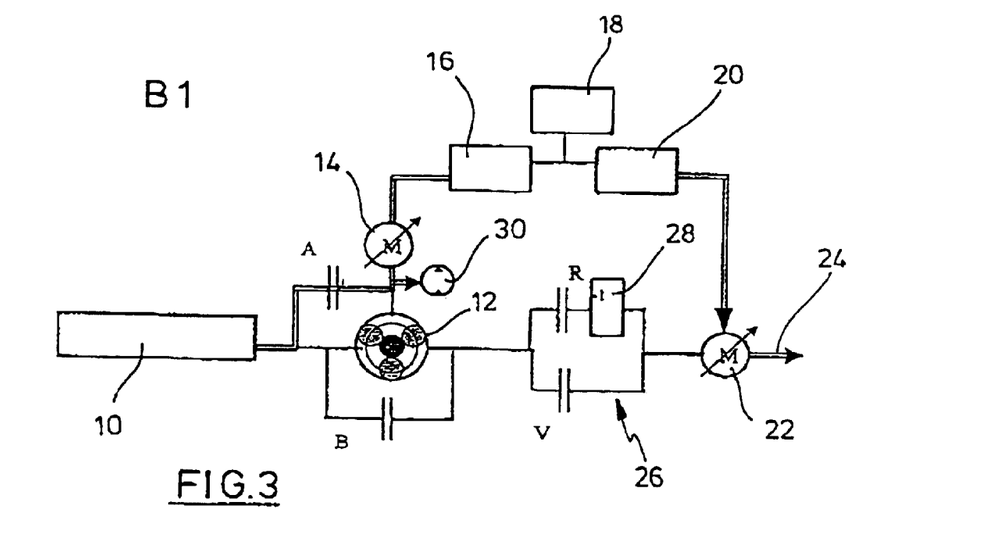
FIG. 3 shows the drive diagram for the "very slow" operation range.

In the "Very slow" operation range according B1 of the table, power is transmitted from the internal combustion engine 10 to the driving shaft of the drive system by the epicyclic gearing 12 being locked up by means of the engaged clutch A and the mechanical path being divided by opening the two couplings R and V of the change-speed gearing. The regulation and control device 34, which is not shown here, operates the electric motors 14, 22 in the four-quadrant regulation mode. When in the driving mode, the electric motor 14 works as a generator and converts the mechanical power produced by the internal combustion engine 10 into electric power which is fed to the onboard network. The electric motor 22 withdraws its power input from the onboard network and generates the driving torque for the truck. The sense of rotation of the output-sided electric motor 22 produces the respective direction of travel. The sense of rotation of the internal combustion engine 10 and electric motor 14 remain unchanged, which does not depend on the direction of travel.

For the braking mode, the electric motor 22 is operated as a generator, the kinetic energy is converted into electric energy, and is fed to the onboard network and, thence, to the battery 18 (effective braking). The four-quadrant mode allows to change (reverse) the direction of travel of the industrial truck with the wheel torque acting onto the truck being maintained constant. There is no change-over process when the direction of travel is changed. The purely electric power transfer in the operation range allows to regulate the travel performances very well.

The internal combustion engine 10 and the two electric motors 14, 22 can be operated at controlled speeds, for example, and this power is withdrawn or supplied, depending on the travel speed, travel power input, power input to the hydraulic pump 30 and the charging condition of the battery. Since electric energy is fed to the onboard network more electric power will be available to the travel drive than would be in case of power supply only from the battery 18.

The hydraulic pump 30 is driven from the electric motor 14 and the internal combustion engine 10. The 4-quadrant regulation mode makes it possible for the electric motor 14 to work either as a motor or a generator, depending on the load applied by the hydraulic pump 30 and the travel power input. It is also possible for the electric motor 14 to work as a generator and to be driven by the hydraulic pump 30 via the torque which is produced by the lowering of the load (effective lowering). The clutch A may be disengaged with a view to enhancing the yield during such an effective lowering. The electric energy thus produced by the lowering of the load can be fed to the battery 18 and utilized for the travel drive. The lifting and lowering speeds are regulated by means of the speed of the electric motor 14 and the speed of the internal combustion engine 10 that is coupled thereto.

If a change-over is to be made from the operation range B1 to operation range B2 (Slow speed) the procedure is as follows: The two clutches R, V of the change-speed gearing 26 are open in the operation range B1 (described above) so that the mechanical path does not transmit any power. The speed of the drive-sided clutch disks is given by the speed of the internal combustion engine 10 and the speed of the electric motor 14 that is coupled thereto and is predetermined in dependence on loads, for example. The speed of the output-sided half-clutch is coupled directly to the travel speed. If the gear ratios are appropriately designed and the internal combustion engine 10 has a certain travel speed and a certain number of revolutions this will result in the synchronous speed in the clutch R, V of the change-speed gearing 26 that is associated with the actual direction of travel.

The transition from the operation range B1 to B2 (from very slow to slow) takes place in the first step by engaging the clutch R, V of the change-speed gearing 26 that is associated with the direction of travel, in the synchronized speed point. In this state of transition, there is a direct mechanical connection from the internal combustion engine 10 to the output shaft 24. The output speed is coupled directly to the speed of the internal combustion engine 10. The control and regulation device 34, which is not shown in the Figures, is utilized to adjust the load of the electric motor 14 in such a way that it results as in the operation range B2 in case of actual loads and speeds. The clutch A will then be largely free from loads and will be disengaged, by which the operation range B2 is reached.

The transmission of load between the input and output units remains fully maintained during all phases of speed change. There is no interruption in the propulsive power.

The change from the operation range B2 back to B1 is effected by the same steps in an inverse order. There will be no restriction in power transfer between the input and output units either in this case.

Figure 4:
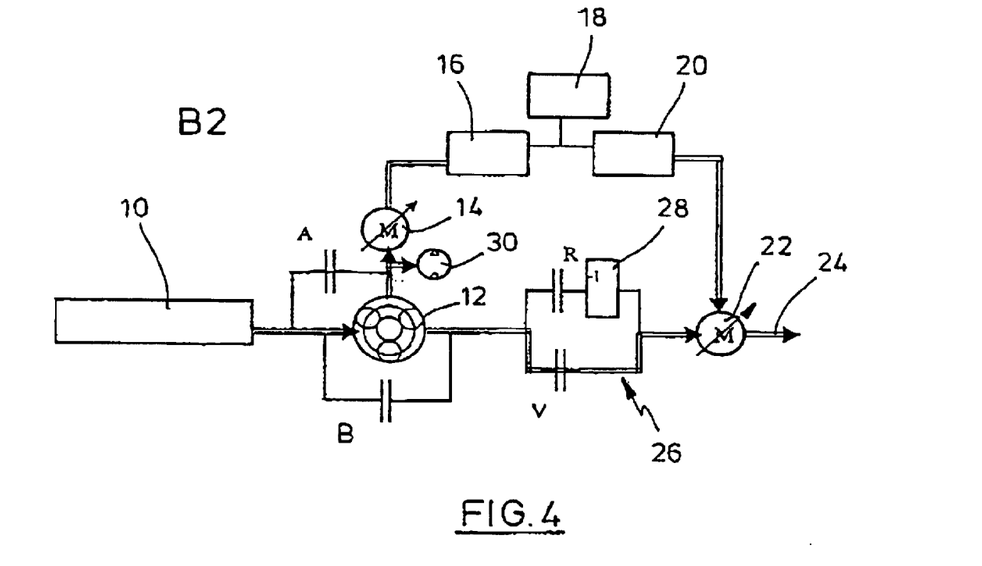
FIG. 4 shows the drive diagram for the "slow" operation range.

In the operation range B2 of FIG. 4, the power produced by the internal combustion engine 10 is transferred to the output shaft 24 via a branching to a mechanical path and an electrical one in the epicyclic gearing 12. The output shaft connected to the epicyclic gearing 12 passes the mechanical power fraction to the summing gearbox and the hollow-shaft motor 22 through the change-speed gearing 26. The motor 14 works as a generator and produces electric power which is fed to the onboard network. The motor 22 withdraws its power input from the onboard network and produces mechanical power which is added to the mechanical power fraction in the summing gearbox. The splitting of power in the epicyclic gearing 12 is regulated by means of the number of revolutions of the internal combustion engine 10 and the electric motor 14 working as a generator, which depends on the travel speed, travel power input, power input of the additional units, and charging condition of the battery. The gear ratio of the gearing assembly between the internal combustion engine 10 and output shaft 24 is infinitely varied here. The motor 22 is operated under a regulated load because its speed is proportional to the travel speed.

For a braking action of the industrial truck, the drive-sided electric motor 22 is operated as a generator, the kinetic energy is converted into electric energy and is fed to the battery from the onboard network (effective braking). The yield in effective braking can be increased or the internal combustion engine 10 can be used as a friction brake and kinetic energy accumulator by relieving the internal combustion engine and electric motor 14 of load, depending on the magnitude of the braking torque.

The hydraulic pump 30 is driven from the electric motor 14 on the epicyclic gearing 12 and the internal combustion engine 10 and the internal combustion engine. The 4-quadrant regulation mode makes it possible for the electric motor 14 to work either as a motor or a generator, depending on the load applied by the hydraulic pump 30 and the travel power input. It is possible for the electric motor 14 to work as a generator and to be driven by the hydraulic pump 30 via the torque which is produced by the lowering of the load (effective lowering). The electric energy thus produced can be fed to the battery 18 and utilized for the travel drive. The lifting and lowering speeds are regulated by means of the speed of the electric motor 14, the speed of the internal combustion engine 10 being adapted accordingly.

Figure 5:
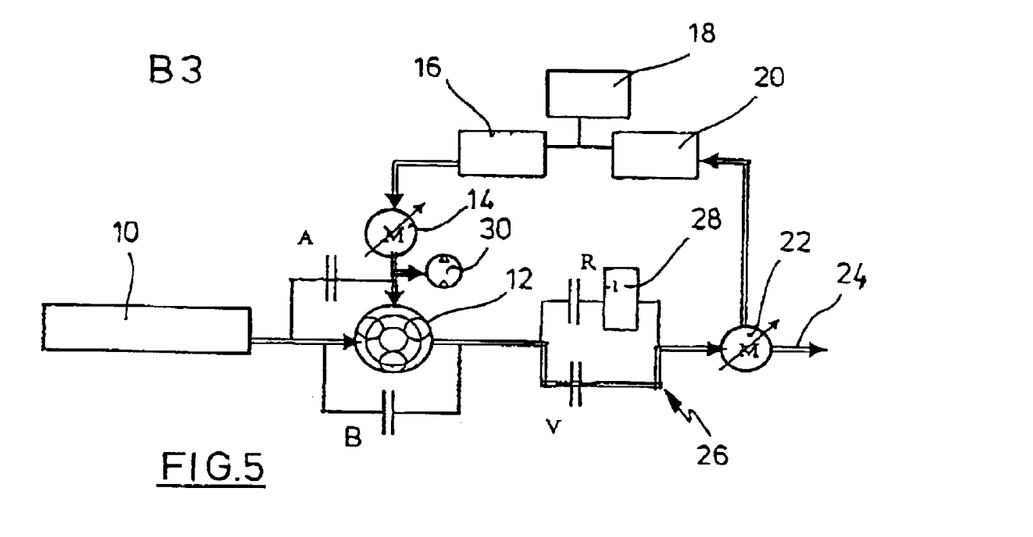
FIG. 5 shows the diagram for the drive system for the "fast" operation range.

In the operation range B3 of FIG. 5 (Fast), the power of the internal combustion engine 10 and the power of the electric motor (possibly reduced by the power input of the additional units) are added in the epicyclic gearing 12 and routed to the mechanical path. The output shaft connected to the epicyclic gearing 12 routes the mechanical power fraction to the hollow-shaft motor 22 and summing gearbox through the change-speed gearing 26. The electric motor 22 works as a generator, withdraws mechanical power via the summing gearbox, and produces electric power which is fed to the onboard network. The electric motor 14 works as a motor and withdraws its power input from the onboard network. The division of power in the epicyclic gearing 12 is regulated by means of the speed of the internal combustion engine 10 and the electric motor 14 working as a motor, depending on the travel speed, travel power input, power input of the additional units, and charging conditions of the battery 18. Thus, the gear ratio of the gearing assembly between the internal combustion engine and the output shaft 24 is varied infinitely.

The industrial truck is braked and effectively braked in the same manner as in the operation range B2.

The hydraulic pump 30 is driven by the electric motor 14 and the internal combustion engine 10. It should be noted that the speed of the motor 14 changes during the transition from the operation range B2 to B3 so that a hydraulic pump 30 needs to be provided that is suitable for either sense of rotation. For the rest, the lifting function is performed in the same way as in the operation range B2. It is also conceivable not to admit the lifting function in the operation range B3 because the travel speed is too high. In this case, the hydraulic pump 30 could be disconnected from the drive via a freewheel to avoid power losses.

Certain conditions have to be met before a change is made from the operation range B3 over to B4 (Fast/Very fast). If the gear ratios are appropriately designed the synchronized speed in the two halves of the clutch B will result in order to lock up the epicyclic gearing 12 at a certain travel speed and a certain speed of the internal combustion engine 10. If the speed is synchronized the clutch B will be engaged under no load and the power led over the clutch will be increased subsequently by relieving the electric motor 14 on the epicyclic gearing 12. The speed of the internal combustion engine and, thus, the synchronized speed for the coupling procedure is dependent on the power input on the output unit in accordance with the performance characteristic curve.

The change from the operation range B4 back to B3 is effected by the same steps in an inverse order. There will be no restriction in power transfer between the input and output units either in this case.

Figure 6:
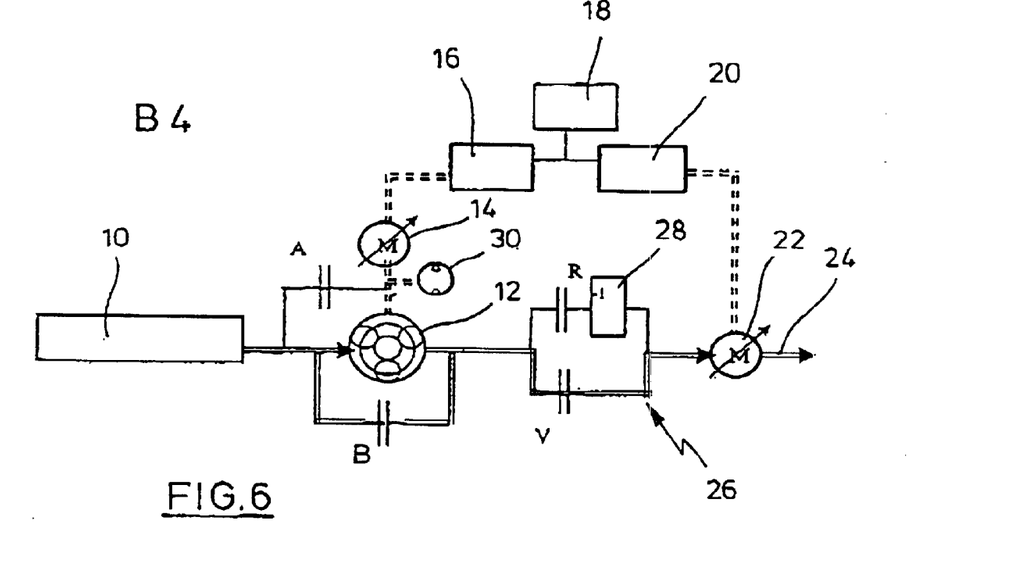
FIG. 6 shows the diagram of the drive system for the "very fast" operation range.

In the operation range B4 (Very fast) of FIG. 6, the power produced by the internal combustion engine 10 is transferred to the output shaft 24 by locking up the epicyclic gearing 12 by means of the clutch B and combining the internal combustion engine directly to the mechanical performance path and an electrical one in the epicyclic gearing 12. The two electric motors 14, 22 are coupled to the travel speed at a fixed gear ratio and are operated at a controlled power. The internal combustion engine 10 is operated at a controlled speed in accordance with the desired travel speed. The direct mechanical transfer of power is particularly low in loss and, hence, is beneficial for large travel lengths at high speeds. To brake the truck, the two electric motors 14, 22 can be operated as generators until the decreasing travel speed make it necessary to change over to another operation range. Since the two electric motors 14, 22 are involved in the braking action a large braking torque is available to achieve a small braking distance and the large kinetic energy of the truck after a fast run can be converted into electric energy by the effective braking and accumulated in the battery 18.

The speed of the hydraulic pump 30 is firmly predetermined by the travel speed. The control of the volumetric flow takes place in the valve block 32 (FIG. 1). If the load is high the electric motor 14 can feed extra power. It is also imaginable not to admit an actuation of the hydraulic pump 30 in the operation range B4 because the travel speed is so large.

Figure 7:
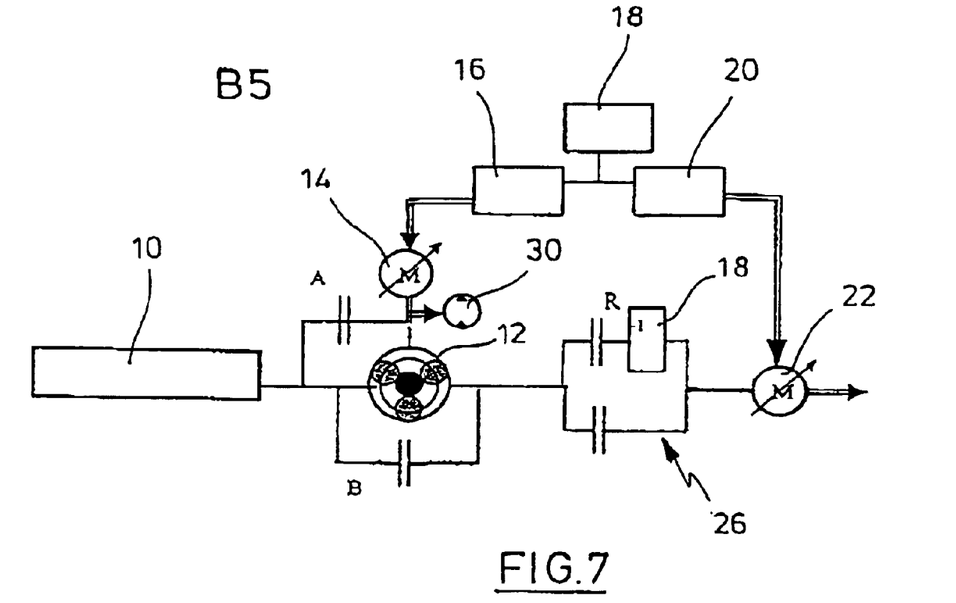
FIG. 7 shows the diagram for the drive system for a zero-emission mode.

A zero-emission mode is required in some cases, e.g. during a stay in enclosed rooms. To this end, all of the clutches A, B, R, and V are disengaged in the operation range B5. The epicyclic gearing 12 cannot transfer any power because the mechanical path provides no supporting torque. The electric motor 14 connected to the epicyclic gearing 12 drives the hydraulic pump 30 and withdraws the power, which it needs for the action, from the onboard network. The electric motor 22 takes over the travel drive and also meets its power input from the onboard network. The operating time and power are limited in this operation range and are dependent on the size and charging condition of the battery. The internal combustion engine 10 is completely turned off.

In the operation range B6 (Parking), the change-speed gearing 26 may assume the function of a parking brake if the two clutches R, V are engaged simultaneously. This blocks the change-speed gearing 26, and the output shaft of the epicyclic gearing 12 is fixed. A fixed gear ratio is predetermined between the internal combustion engine 10 and the electric motor 12.

An extra parking lock or parking brake may be provided which is independent of the gearing. Both of the clutches A and B are disengaged and the internal combustion engine 10 can be used to re-charge the battery 18 by operating the electric motor 14 as a generator.

The hydraulic pump 30 is driven from the electric motor 14 and the internal combustion engine 10. Lifting, lowering, and effective lowering are performed in the same way as is described for the operation range B1.

In the operation range B7, the internal combustion engine 10 is started by the motor 14 via the epicyclic gearing 12. Starting from the operation range B6 (Parking) where a fixed gear ratio is provided in the epicyclic gearing 12, the electric motor 14 brings the internal combustion engine 10 to its starting speed.

Proceeding from the operation state B5 (zero-emission mode), the clutch A is engaged so that the electric motor 14 can start the internal combustion engine and the operation state B1 exists afterwards.

If the internal combustion engines are started from a different operation state the operation state B5 (zero-emission mode) is adjusted first.

The drive assembly described employs a branched power using overlying gearboxes. A large adjustment range in the branched-power mode is identical to a large power flow in one of the branches at the boundaries of the adjustment range. Therefore, the gearing component require to be dimensioned accordingly. The larger the adjustment range is in the branched-power mode the larger have the individual components to be dimensioned, which involves great expenditure. In the drive systems described, the ranges including serial power transfer (B1, B4) reduce the adjustment range by branching the power so that the gearing and drive components can be made smaller in their dimensions.

The control of the drive system shown aims at making available the travel performance required of the operator at an optimum ride comfort (e.g. an acceleration reserve) at a minimum consumption of energy. The drive system described is controlled by a superior-ranked control and regulation device as is illustrated at 34 in FIG. 1. The superior-ranked control device controls the flow of power between components where favourable-efficiency operation points are not only found for the components themselves in response to the predetermined preset values from the operator interface 36, but also the status variables of the components are considered in order to optimize the overall efficiency.

A control process for the drive system described can use different strategies for this purpose:

An overall efficiency family of characteristics is formed in advance with regard to the travel performance and travel speed for the entire drive system and the optimum adjustment characteristic curve is established therein in response to the efficiency family of characteristics of all components. In dependence on certain parameters, e.g. the charging condition of the battery, the most fitting family of characteristics one can be selected from several existing overall efficiency families of characteristic with a respective adjustment characteristic curve.

The control of each component has filed therein the component efficiency families of characteristics in dependence on the status variables. The status variables and efficiencies of the components are regarded continuously. The controls pertaining to the components are capable of determining the actual efficiency and (e.g. upon request from a superior-ranked control) the efficiency of a random operation point. The superior-ranked control may predetermine the operating states of the components, by applying algorithms and/or stored experience-based knowledge, such that the overall system operated at an optimum efficiency.

A superior-ranked control undertakes the task of sending the preset values of the operation points to the controls of the components while taking into account the actual status variables by applying stored experience-based knowledge.

Figure 8:
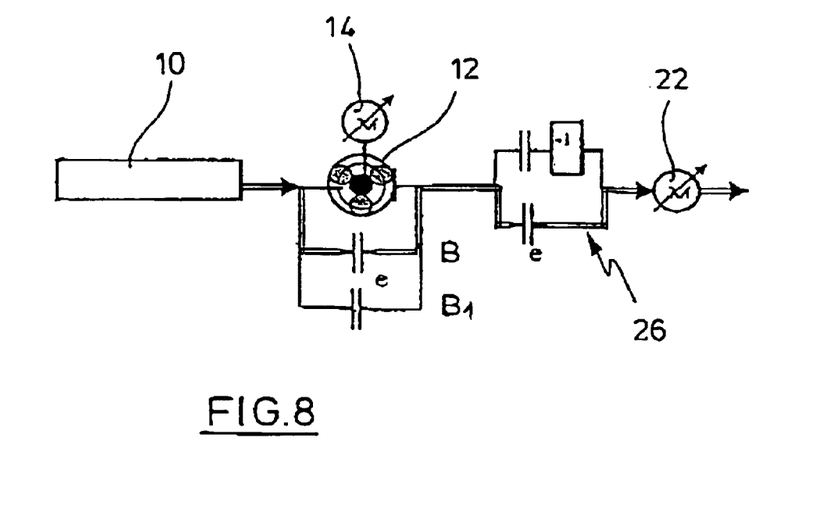
FIG. 8 shows an alternative embodiment for the drive system of FIG. 1.

Two lockup clutches B and B1 are provided in the embodiment of FIG. 8. Either branch can have associated therewith a certain gear ratio so that a plurality of gear ratios can be realized. The clutches A and B can be associated to one gear ratio each also in the embodiments illustrated previously.

Figure 9:
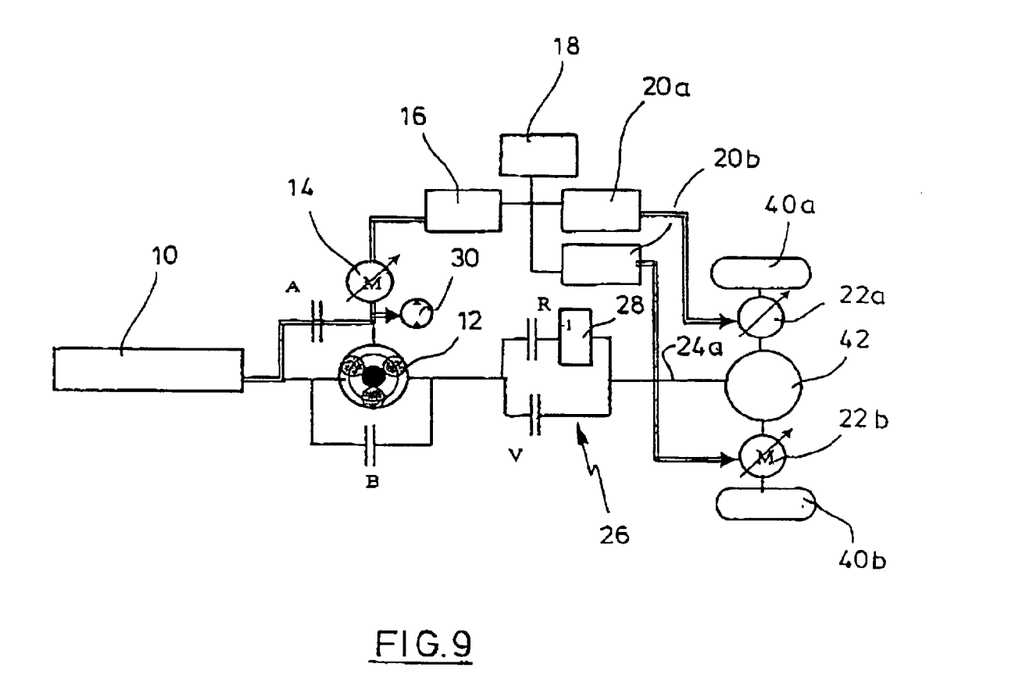
FIG. 9 shows an alternative embodiment for the drive system of FIG. 1.
Figure 10:
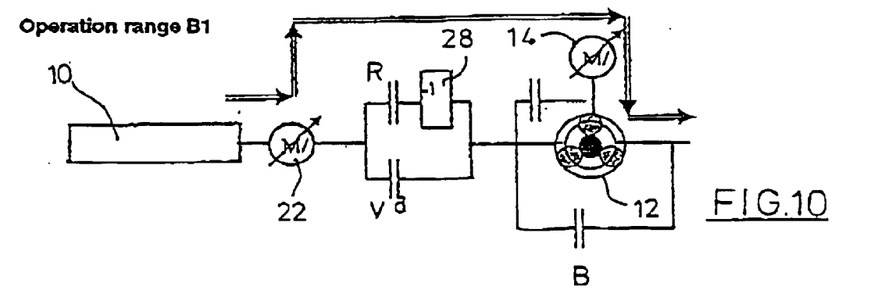
FIGS. 10–13 show an alternative embodiment of the drive system of FIG. 1 for the various operation ranges.
Figure 11:
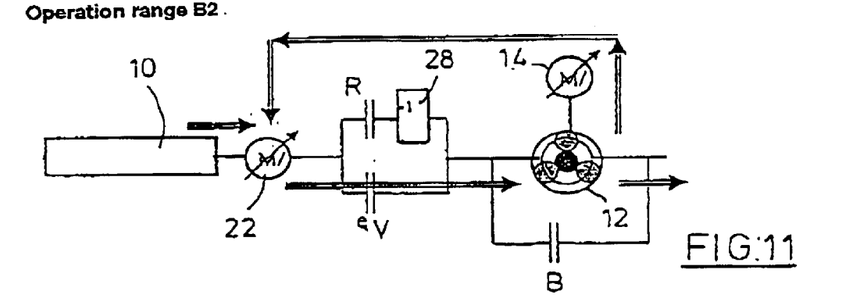
Figure 12:
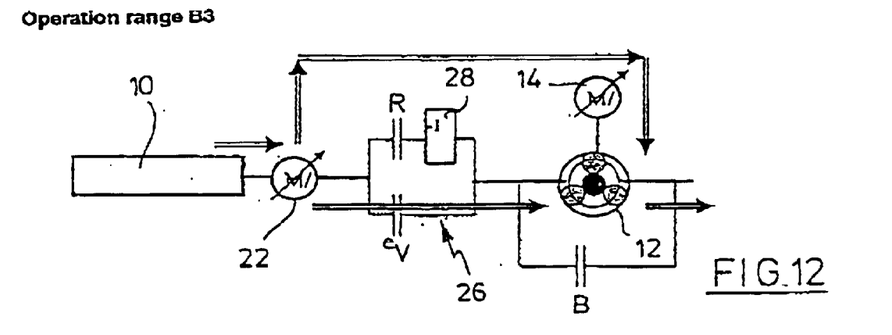
Figure 13:
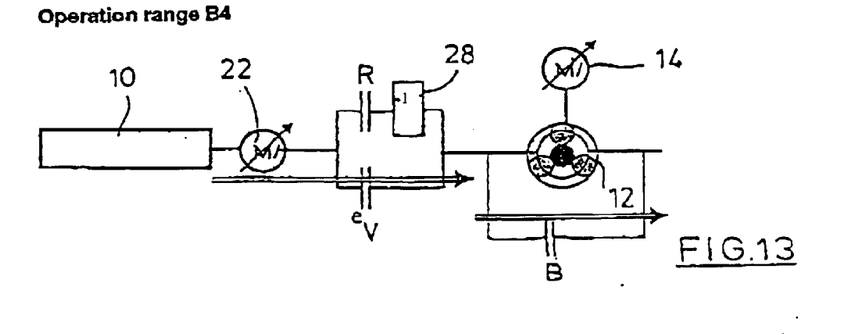

The embodiment of FIG. 9 distinguishes itself from that of FIG. 1 or FIGS. 3 through 7 in that the electric motor 22 is broken up into two electric motors 22a, 22b one of which drives a wheel 40a, 40b each of the industrial truck. The output shaft of the change-speed gearing 26, via a branched gearing 42, acts onto the shafts of the electric motors 22a, 22b which, in turn, act as a summing gearbox by being designed as a hollow-shaft motor. It is understood that a different summing gearbox can be used. The embodiment of FIG. 9 makes it possible to support a steering system actively.

Finally, it is conceivable to provide a gearing as is illustrated in FIGS. 1 and 3 through 7 as two gearings so that the speed of two driving wheels can be regulated individually in response to cornering travels. An axle differential is unnecessary here.

In the embodiment of FIGS. 10 through 13, the previously described gearing system is inversed with regard to the direction of its flow of power. The output shaft 24 of the foregoing Figures now has connected thereto the internal combustion engine 10 and the former input shaft of the gearing assembly becomes the output shaft. The flow of power for the operation ranges B1 to B4 results from FIGS. 10 through 13. However, no change results to the procedures which are described farther above with regard to the individual operating ranges of the industrial truck.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A drive system for an industrial truck, comprising
    an internal combustion engine (10),
    a three-shaft epicyclic gearing (12) adapted to be connected to the shaft of the internal combustion engine (10),
    a first electric motor (14) which is mechanically coupled to the second shaft of the epicyclic gearing (12) and is connected to an onboard network of the industrial truck,
    a change-speed gearing (26) coupled to the third shaft of the epicyclic gearing (12),
    a summing gearbox coupled to the change-speed gearing the other input shaft of which is connected to a second electric motor (22) which is electrically connected to the onboard network and the output shaft (24) of which is coupled to at least one driven wheel of the industrial truck,
    a clutch (A) between the first and second shafts of the epicyclic gearing (12),
    at least one consumption unit (30) for an additional function of the industrial truck that is coupled to one of the shafts of the epicyclic gearing (12),
    a sensor device which measures the speeds of the internal combustion engine (10), the first and second electric motors (14, 22), and the driving wheel and generates respective signals, and
    a control and regulation device (34) which controls or regulates the speeds of the electric motors (14, 22) and internal combustion engine (10), and controls the motor or generator operation of the electric motors (14, 22) and the actuation of the clutch (A) and change-speed gearing (26) in response to set-point signals (36) from the set-point transmitters actuated by the operator of the industrial truck and on the basis of the output signals of the sensor device.

2. The drive system for an industrial truck, comprising an internal combustion engine (10), a three-shaft epicyclic gearing (12) adapted to be connected to the shaft of the internal combustion engine (10), a first electric motor (14) which is mechanically coupled to the second shaft of the epicyclic gearing (12) and is connected to an onboard network of the industrial truck, a change-speed gearing (26) coupled to the third shaft of the epicyclic gearing (12), a summing gearbox coupled to the change-speed gearing the other input shaft of which is connected to a second electric motor (22) which is electrically connected to the onboard network and the output shaft (24) of which is coupled to at least one driven wheel of the industrial truck, a clutch (B) between the first and third shafts of the epicyclic gearing (12), at least one consumption unit (30) for an additional function of the industrial truck that is coupled to one of the shafts of the epicyclic gearing (12), a sensor device which measures the speeds of the internal combustion engine (10), the first and second electric motors (14, 22), and the driving wheel and generates respective signals, and a control and regulation device (34) which controls or regulates the speeds of the electric motors (14, 22) and internal combustion engine (10), and controls the motor or generator operation of the electric motors (14, 22) and the actuation of the clutch (A) and change-speed gearing (26) in response to set-point signals (36) from the set-point transmitters actuated by the operator of the industrial truck and on the basis of the output signals of the sensor device.

3. The drive system according to claim 2, characterized in that the drivable wheel and the internal combustion engine (10) are interchanged with regard to their positions to the gearing assembly.

4. The drive system according to claim 1, characterized in that the change-speed gearing (26) has two parallel branches including a clutch (R, V) each wherein one branch has a turn-around gearing (28).

5. The drive system according to claim 1, characterized in that the second electric motor (22) is a hollow-shaft motor.

6. The drive system according to claim 1, characterized in that the consumption unit is a hydraulic pump (30) which is coupled to the shaft of the first electric motor (14).

7. The drive system according to claim 6, characterized in that it provides a hydraulic pump (30) which works in the two senses of rotation.

8. The drive system according to claim 1, characterized in that the first and second clutches (A, B) are configured as a constructional unit with the epicyclic gearing (12).

9. The drive system according to claim 1, characterized in that the turn-around gearing (28) is configured as a constructional unit with the two clutches (R, V).

10. The drive system according to claim 1, characterized in that a transmission ratio is associated with the first and/or second clutch.

11. The drive system according to claim 1, characterized in that the second electric motor is formed by two parallel-connected electric motors (22a, 22b) which are coupled to one driving wheel (40a, 40b) each.

12. The drive system according to claim 1, characterized in that an overall efficiency family of characteristics is formed with regard to the travel performance and travel speed and an optimum adjustment characteristic curve is established in response to the efficiency family of characteristics of the internal combustion engine (10) and electric motors (14, 22).

13. The drive system according claim 12, characterized in that in dependence on certain parameters, e.g. the charging condition of the battery (18) the fitting family of characteristics is selected from several existing overall efficiency families of characteristics with a respective adjustment characteristic curve.

14. A method for the operation of a drive system according to claim 1, characterized in that if the speed is very slow (operation range B1) the power of the internal combustion engine (10) is transmitted to the driving wheel exclusively via the electric motors (14, 22) by engaging the first clutch (A) and disengaging the change-speed gearing (26) and the first electric motor (14) works as a generator.

15. A method for the operation of a drive system according to claim 1, characterized in that if speeds are high (operation range B4) the power of the internal combustion engine (10) is transmitted to the driving wheel in a directly mechanical way by engaging the second clutch (B) with the two electric motors (14, 22) being coupled to the travel speed via a predetermined transmission ratio.

16. The method according to claim 14, characterized in that if the gear range changes over very slowly to the neighbouring speed range the change-speed gearing (26) is shifted in the synchronized speed point and the synchronous speed is established on the first clutch (A) subsequently by activating the first electric motor (14), whereupon the first clutch (A) is disengaged.

* * * * *